United States Patent
Haase et al.

[11] 3,785,742
[45] Jan. 15, 1974

[54] DEBURRING AND CHAMFERING APPARATUS

[75] Inventors: Willard A. Haase; Ingwald E. Wegenke, both of Montello, Wis.

[73] Assignee: Montello Products Company, Montello, Wis.

[22] Filed: Aug. 24, 1972

[21] Appl. No.: 283,503

[52] U.S. Cl. .................... 408/3, 90/13 R, 90/13.2
[51] Int. Cl. .......................................... B23b 29/26
[58] Field of Search ................. 90/13.2, 13.3, 13.5, 90/13 R; 408/3, 103, 234, 159

[56] References Cited
UNITED STATES PATENTS
| | | | |
|---|---|---|---|
| 3,548,710 | 12/1970 | Kaplan | 90/13.1 |
| 3,318,175 | 5/1967 | Cogsdill | 408/159 |

Primary Examiner—Gil Weidenfeld
Attorney—C. Frederick Leydig et al.

[57] ABSTRACT

Apparatus for deburring and chamfering at least one side of an opening in a contoured surface of a metal workpiece comprising a sliding platform having a clamping mechanism for holding and positioning the workpiece relative to a cutting tool which uniformly cuts the edge of the opening to deburr and chamfer it. The apparatus has an elongated spindle mounted for axial and rotational movement and a cam follower on the spindle that cooperates with a stationary cam surface having a contour corresponding to the contour of the workpiece surface. During rotation of the spindle, the cutting tool is guided to follow the contoured surface of the workpiece opening and thereby produces a uniformly chamfered opening.

12 Claims, 5 Drawing Figures

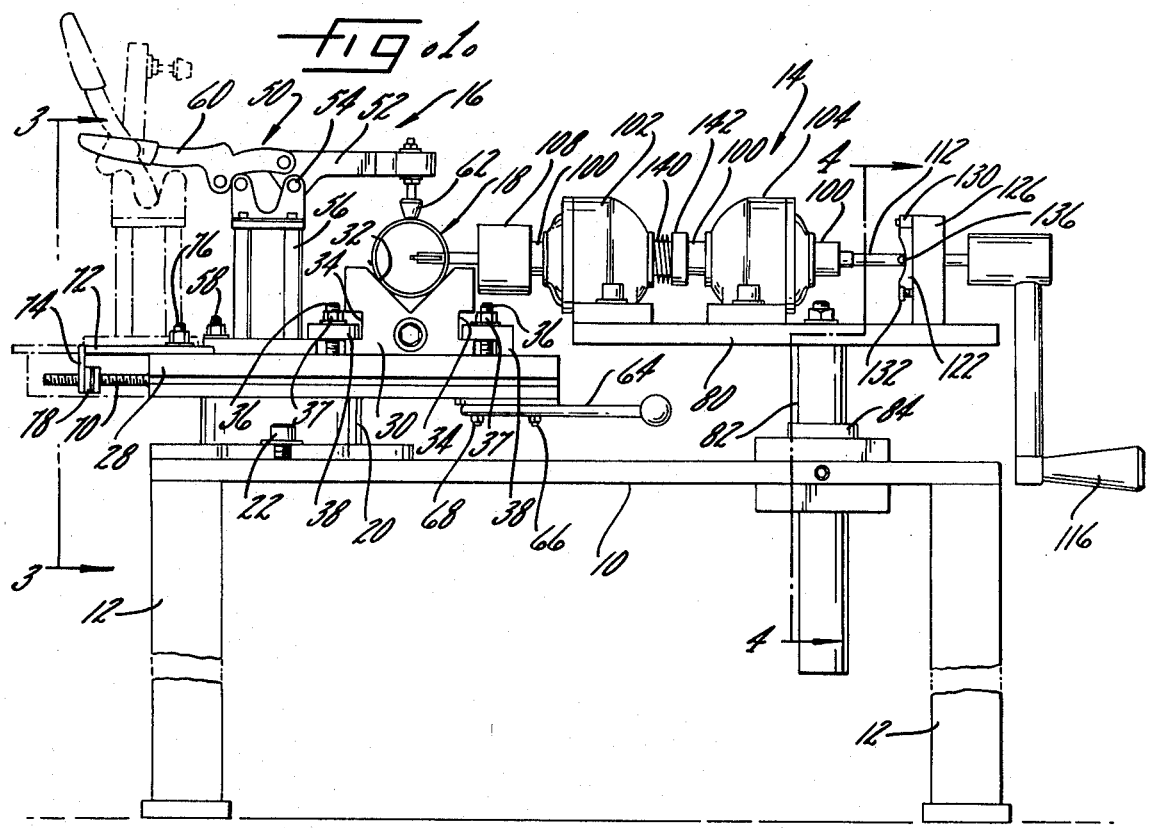

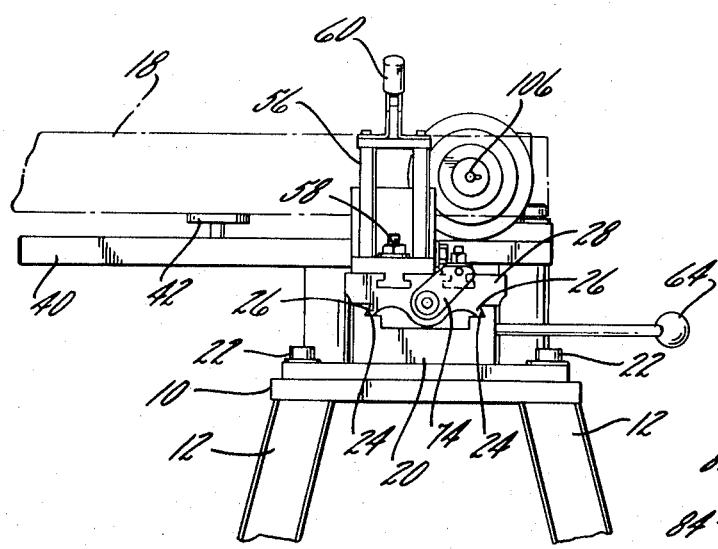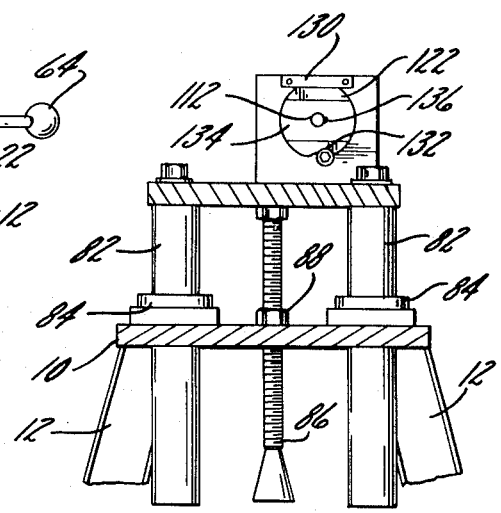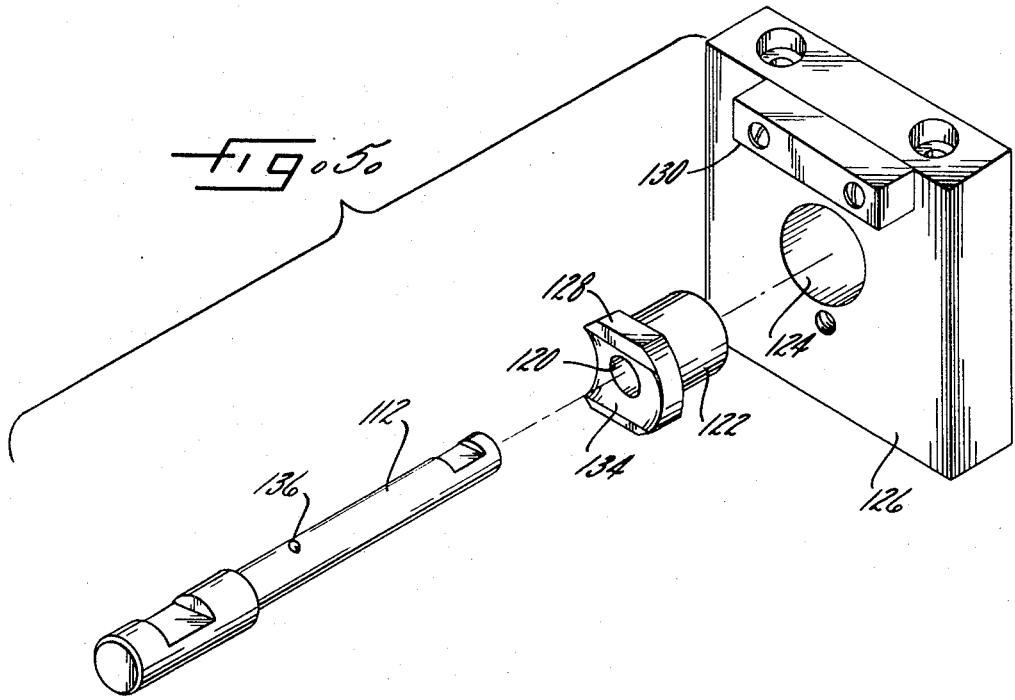

DEBURRING AND CHAMFERING APPARATUS

The present invention relates generally to deburring and chamfering apparatus and, more specifically, to apparatus particularly adapted to deburr and chamfer an opening in a contoured surface of the workpiece, such as, for example, the inside surface of a drilled opening in the sidewall of a hollow cylinder or the like.

When an opening is drilled or punched in a metal workpiece, burrs are often produced around the edges of the opening. Such burrs are objectionable and their removal is generally required, particularly if the workpiece must satisfy quality control standards. A separate operation is usually performed to remove the burrs from the edge and to smooth the edge of the drilled or punched opening. It should be appreciated that it is more difficult to deburr and chamfer an inside edge of an opening of many workpieces due to the fact that only limited access to the inside surface may exist, and in many instances the only access for a cutting tool is through the opening itself.

While it is possible to deburr the interior side of an opening by using either a manually applied tool or a rotatable tool having a radially expandable cutting surface, permitting a tool to be inserted through the opening and thereafter expanded to make contact with the interior edge and remove the burrs and chamfer the opening, it should be appreciated that the deburring and chamfering operation is more difficult in the event the interior surface is contoured. For example, drilling an opening in the curved wall of a hydraulic cylinder would present a contoured surface in which to deburr and chamfer on both the inside and outside of the cylinder. If a rotatable cutting tool was inserted through the hole and its cutting surface expanded, rotation thereof without any accompanying axial movement of the cutting surface of the tool would result in an uneven chamfer. Of course it should be appreciated that a considerable amount of material may be removed from certain portions of the edge of the opening while other portions may be relatively unaffected if the contour of the surface is quite pronounced. The consequences of such uneven deburring and chamfering may be significant if the wall of the workpiece is not particularly thick, and such uneven chamfering could affect the structural strength of the workpiece. Moreover, deburring and chamfering an opening with hand operated tools and grinders is often time consuming and costly and may require considerable reworking before an acceptable chamfer is produced.

Accordingly, it is a primary object of the present invention to provide apparatus which is adapted to deburr and uniformly chamfer an opening in a contoured surface. A related object is to provide an apparatus which will perform the deburring and chamfering operation at low cost and in a very short time.

Another object of the present invention is to provide apparatus for deburring and chamfering a circular opening in a contoured surface, wherein a cutting tool having a radially extending cutting surface is inserted through the opening, thereafter expanded to contact the edge of the opening to deburr and chamfer it when rotated, the apparatus being adapted to guide the tool during rotation so that the cutting surface follows the contour of the surface of the workpiece being cut.

A more specific object of the present invention lies in the provision of a cam surface and cam follower for guiding the cutting tool so that the cutting surface of the tool follows the contour of the surface being worked during rotation of the tool.

Yet another object of the present invention is to provide an apparatus that enables the deburring tool to exert a uniform cutting force during the deburring and chamfering operation so that a uniform chamfer is produced with a minimum number of revolutions of the chamfering tool.

Still another specific object of the present invention is to provide an apparauts having a sliding table with a clamping mechanism so that a workpiece may be quickly clamped and moved into position relative to the deburring and chamfering tool and thereby enable the operation to be performed in a very short time.

Yet another object of the present invention lies in the provision of easily changing the cam surface of the apparatus so that the deburring and chamfering operation may be performed on a virtually infinite variety of contoured surfaces and workpieces. More specifically it is an object of the present invention to provide an apparatus which has the capability of adjusting the depth of penetration of the deburring tool relative to the workpiece, the horizontal and vertical position of the deburring tool relative to the workpiece, as well as the angular orientation of the workpiece relative to a tool.

Other objects and advantages will become apparent upon reading the following detailed description, while referring to the attached drawings, in which:

FIG. 1 is a side elevation of an apparatus embodying the present invention;

FIG. 2 is a top plan view of the apparatus shown in FIG. 1;

FIG. 3 is an end view of the apparatus of the present invention, taken generally alone the line 3—3 of FIG. 1;

FIG. 4 is a sectional view of the apparatus taken generally along the line 4—4 of FIG. 1; and FIG. 5 is an exploded perspective view of a portion of the apparatus shown in the other figures.

While the present invention is described in connection with certain preferred embodiments, it should be understood that it is not intended to limit the invention to these particular embodiments. On the contrary, it is intended to cover all alternatives, modifications and equivalents as may be included within the spirit and scope of the invention as expressed in the appended claims.

Turning to the drawings, and particularly FIGS. 1 and 2, apparatus embodying the present invention is shown to include a frame structure 10 preferably supported by legs 12, with the frame structure carrying a vertically adjustable cutting assembly, indicated generally at 14, and a clamping assembly, indicated generally at 16 that is adapted to hold and position a workpiece 18. The workpiece is specifically shown to be a hollow cylindrical object, such as a hydraulic cylinder housing or the like, although the apparatus of the present invention is adapted to accommodate workpieces of many different sizes and shapes.

Broadly stated, the manner of operation of the apparatus is to place a workpiece 18 having an opening therein to be deburred and chamfered onto the clamping assembly with the opening positioned in line with the cutting tool, apply the clamping mechanism to firmly hold the workpiece and thereafter move the clamping assembly to the right as shown in FIG. 1 so that the cutting tool will penetrate the opening and position it for the cutting operation. After the cutting tool has penetrated the opening, the cutting surface of the tool is radially expanded to contact the interior edge of the opening. An operator then merely turns the handle a limited number of revolutions to perform the cutting operation and thereby deburr and chamfer the inside of the opening.

The cutting tool is connected through a number of components to the hand crank or handle and all of the components as well as the handle and cutting tool are mounted for axial and rotational movement so that the cutting tool may be guided to follow the contour of the interior surface of the workpiece during the cutting operation. A cam and cam follower are provided in the cutting assembly to guide the axial movement of the cutting tool during rotation to achieve an even depth of cut by the cutting surface.

Turning more specifically to the clamping assembly 16 best shown in FIGS. 1–3, a stationary support 20 is secured to the frame structure 10 by a pair of bolts 22 or the like, and has a pair of opposed, angularly disposed surfaces 24 cooperating with a pair of downwardly extending legs 26 of a sliding table or platform 28, enabling the platform to slide to the left or right as shown in FIG. 1 and position the workpiece relative to the cutting assembly 14. The angular orientation of the surfaces 24 and the legs 26 prohibit tipping or other movement of the table 28, except for the desired sliding movement and thus insures that the workpiece will not deviate from its preferred position during the cutting operation.

To support the workpiece, a supporting block 30 is provided, and in the illustrated embodiment has a V-shaped upper surface configuration 32 that is adapted to support the cylindrical workpiece 18. The support block 30 has recesses 34 on opposite sides enabling square headed bolts 36, nuts 37 and plates 38 to hold the block 30 to the sliding table 28. It should be understood that loosening the nuts 37 permits removal and replacement of the block 30 with other blocks that may be better suited to the configuration of other workpieces 18. Moreover, loosening of the nuts 37 also permits the repositioning of the block 30 at a different angle if desired. As best shown in FIGS. 2 and 3, the block has an outwardly extending arm 40 secured to it for providing additional support of the workpiece in the event it is appreciably longer than the block itself. To this end, a threaded supporting surface 42 may be threadably inserted into any one of the threaded apertures 44 with the height of the support surface 42 being variable depending upon how deeply the support surface is threaded into the aperture 44.

As is best shown in FIGS. 2 and 3, the sliding table 28 has two T-shaped slots 46 and 48 into which the square headed bolts 36 are placed, enabling the bolts and therefore the support block 30 to be longitudinally moved relative to the table.

In keeping with the present invention and referring to FIGS. 1–3, a clamping mechanism, indicated generally at 50, is provided for firmly holding the workpiece in the support block 30 and comprises an arm 52 pivotable around a pin 54, carried by a framework 56 which is similarly anchored to a sliding table 28 by a pair of square headed bolts 58. The arm 52 is also connected to a handle 60 by means of a conventional linkage so that when the handle is raised, the arm 52 will move to a generally vertical position as is shown in phantom in FIG. 1. When the workpiece is inserted into the support block 30 and the handle 60 depressed as shown in solid lines, a member 62 which is threadably and therefore adjustably secured to the arm 52 contacts the workpiece and firmly holds it in position.

To slide the table 28 toward the cutting assembly 14, a lever 64 is provided with its mid portion connected by a bolt 66 to the table 28 and its opposite end portion connected to the stationary support 20 by means of a bolt 68 attached to a member which is not shown. Thus, an operator may slide the table to the right or left as shown in FIG. 1, by merely moving the lever 64 in the desired direction.

Provision is also made for stopping the rightward movement of the sliding table 28 so that the workpiece is optimumly positioned relative to the cutting assembly 14. To this end, a threaded rod 70 extends through an opening in a sliding table 28 and is secured to the stationary support 70 so that the table is movable relative to the threaded rod. A generally horizontal member 72 having an attached member 74 with an aperture located therein is secured to the T-shaped slot 48 of the sliding table by a square headed bolt 76. The apertured member 74 is aligned to enable the threaded rod to pass through it so that rightward movement of the sliding table 28 is stopped due to contact of the member 74 with a threaded nut 78 located on the rod 70. By rotating the nut 78, the rightward movement of the sliding table may be easily adjusted.

In accordance with an important aspect of the present invention and turning now to the cutting assembly 14, a vertically adjustable support plate 80 is attached to the frame structure 10 by means of two cylindrical members 82 which are slidable in bushings 84 that are secured to the frame structure 10. A threaded rod 86 passes through a larger unthreaded opening in the frame structure 10 so that the height of the plate 80 may be adjusted by rotating a threaded nut 88.

To perform the cutting operation, a large diameter shaft 100 is supported by pillow blocks 102, 104 or the like, which are adapted to permit axial as well as rotational movement of the shaft 100. A deburring and chamfering tool 106 is attached to the shaft 100 by means of a coupling 108 having set screws 111 or the like to permit the tool to be easily removed and replaced. The tool 106 is preferably the type that has a radially expandable cutting surface 110 enabling its insertion through an opening in the workpiece virtually without contact, thereby reducing the chance of damaging the opening, particularly if it has been previously threaded. It is also preferred that the cutting tool be of the type that is spring loaded so that after the cutting surface has been radially extended, the tension of the spring in the tool will cause the cutting surface to bear upon the edge of the opening in the workpiece with a constant, uniform force.

A smaller diameter shaft 112 is suitably attached to the opposite end of the shaft 100 by a set scew 114 or the like and a hand crank of handle 116 is also attached to the shaft 112, preferably with a set screw 118. It should be understood that an operator turning the crank 116 rotates the cutting tool 106 since the hand crank 116, shaft 112, shaft 100 and cutting 108 are positively secured to one another by the couplings and set screws previously described.

Turning now to the important aspect of the present invention, and referring to FIGS. 1 and 5, the shaft 112 extends through an aperture 120 located in a cam member 122 which, in turn, is inserted in a larger aperture 124 located in a support block 126 that is attached to the plate 80. The cam member 122 has a flat upper surface 128 which contacts a bar 130 attached to the block 126 and prevents the cam member 122 from rotating. A set screw 132 is also provided to lock the cam member 122 to the block and thereby prevent the cam member 122 from moving out of the block. The cam member also has a contoured cam surface 134 that is adapted to contact a cam follower which is shown to be a ball bearing 136 or the like rotatably secured to the shaft 112. By rotating the hand crank 116 the shaft 112 and therefore the cutting tool 106 will move axially in a path defined by the contour of the cam surface 134, provided the cam follower 136 remains in contact with the cam surface 134.

In keeping with the present invention, the contour of the cam surface is preferably substantially identical to the contour of the surface being deburred and chamfered, and in the illustrated embodiment, it is substantially identical to the contour of the inner surface of the hollow cylindrical workpiece 18. Thus, as the hand crank is turned, the interaction of the cam surface and cam follower will cause the cutting tool to follow the contour of the inner surface of the workpiece and produce a uniform, even cutting of the edge of the opening. It is also preferred that the diameter of the shaft 112 be substantially equal to the diameter of the cutting tool 106 for optimum results, since the path of the cutting surface of the cutting tool 106 would be different from the path of the cam follower 136 in the event they had different radii, although cam surfaces could be developed to compensate for a difference in their diameters. It should also be realized that cam surfaces may be developed to produce either a uniform or non-uniform chamfer for many different surface contours, so long as the change in the surface contour is not so severe that the cutting tool would be damaged during rotation.

To insure that the cam follower 136 remains in contact with the cam surface 134 during rotation of shaft 112, a spring 140 having one end bearing upon the pillow block 102 and the other end bearing upon an annular ring 142 affixed to the shaft 100 by a set screw 144 or the like is provided to continually bias the shaft 100, and therefore the shaft 112 to the right as illustrated in FIG. 1. The biasing force constantly urges the cam follower 136 to bear against the cam surface 134 and eliminates the necessity of the operator to urge the hand crank 116 to the right during rotation and insures that the cutting tool will follow the surface contour of the workpiece and produce an even cutting action.

It shoud be understood from the foregoing description that apparatus has been described that enables rapid deburring and chamfering of workpieces. An operator merely vertically positions the cutting assembly to align the cutting tool at the elevation of the opening through which the cutting tool will be inserted, places a workpiece in the V-shaped support block 30, depresses the handle 60 to clamp the workpiece, moves the handle 64 to the right so that the cutting tool penetrates the opening, radially extends the cutting surface of the cutting tool 106 and thereafter turns the hand crank 116 a limited number of revolutions to perform the deburring and chamfering operation. Once the apparatus is set up for a particular workpiece, the deburring and chamfering operation may be carried out on each workpiece in a very short time. Thus, the apparatus satisfies all of the objects and advantages as have been hereinbefore described. We claim as our invention:

1. Apparatus for deburring and chamfering at least one side of an opening in a contoured surface of a workpiece, comprising, in combination:
   means for clamping said workpiece to prohibit movement thereof during deburring and chamfering said opening;
   mean for uniformly cutting the edge of said opening to deburr and chamfer said opening, comprising an elongated shaft mounted for axial and rotational movement, a cam follower operably associated with said shaft, a stationary cam member having a cam surface adapted to contact said cam follower and axially move said shaft during rotation thereof, a cutting tool secured to said shaft for cutting the edge of said opening and said cutting tool being radially expandable after penetrating said opening so as to deburr and chamfer the entire peripheral edge thereof when said tool is rotated, said cam surface providing a guide for said cam follower to axially move said cutting tool during rotation thereof so that said cutting surface follows a predetermined path during rotation.

2. Apparatus as defined in claim 1 wherein a handle is attached to said shaft for rotating said shaft and cutting tool.

3. Apparatus as defined in claim 1 wherein the contour of said cam surface has a contour substantially similar to the contour of said workpiece surface having said opening being deburred and chamfered.

4. Apparatus as defined in claim 3 wherein the diameter of said shaft is substantially similar to the diameter of said cutting tool, the combination of said substantially similar contours and diameters being effective to guide said cutting tool so that a uniform chamfer is produced.

5. Apparatus as defined in claim 1 wherein said clamping means is horizontally movable relative to said cutting means to properly position said workpiece relative to said cutting tool.

6. Apparatus as defined in claim 5 wherein said cutting means is vertically adjustable for properly positioning the elevation of said workpiece relative to said cutting tool.

7. Apparatus as defined in claim 1 wherein said cam follower comprises raised surfaces located on said shaft and adapted to contact said cam surface during rotation.

8. Apparatus as defined in claim 1 wherein said cam member has an aperture for receiving said shaft, the cam member being removably secured to permit interchangability with other cam members having different surfaces.

9. Apparatus as defined in claim 1 including means for biasing said cam follower against said cam surface.

10. Apparatus as defined in claim 5 wherein said clamping means comprises a support (20) with a table slidable thereon, a clamping mechanism adapted to hold said workpiece and a lever connected to said support and slidable table adapted to horizontally move said table and workpiece into position relative to said cutting tool.

11. Apparatus for deburring and chamfering an interior contoured surface of an opening in a workpiece, comprising, in combination:
- a frame structure;
- a first platform slidably mounted on said frame structure and carrying a clamping assembly for releasably holding said workpiece, said platform being adapted to move said workpiece to a predetermined position for deburring and chamfering;
- a second platform connected to said frame structure and adapted to be vertically adjustable relative to said workpiece;
- a rotatable and axially movable shaft mounted to said second platform;
- a cutting tool connected to one end of said shaft and adapted to penetrate said workpiece opening when said first platform moves said workpiece to said predetermined position and said cutting tool being radially expandable so as to deburr and chamfer said opening when said tool is rotated;
- a stationary cam member supported by said second platform adjacent said shaft and having a cam surface contour substantially similar to the contoured surface of said workpiece;
- a cam follower mounted on said shaft and adapted to contact said cam surface, the interaction of said cam surface and cam follower being effective to axially move said cutting tool to follow the contour of said workpiece interior surface during rotation of said shaft and cutting tool and produce a uniform chamfer of said opening.

12. Apparatus as defined in claim 11 including a spring acting on said shaft for constantly urging said cam follower toward said cam surface.

* * * * *